D. F. OLIVER.
VEHICLE BODY.
APPLICATION FILED OCT. 17, 1912. RENEWED JAN. 22, 1916.

1,199,600.

Patented Sept. 26, 1916.
2 SHEETS—SHEET 1.

D. F. OLIVER.
VEHICLE BODY.
APPLICATION FILED OCT. 17, 1912. RENEWED JAN. 22, 1916.
1,199,600.
Patented Sept. 26, 1916.
2 SHEETS—SHEET 2.
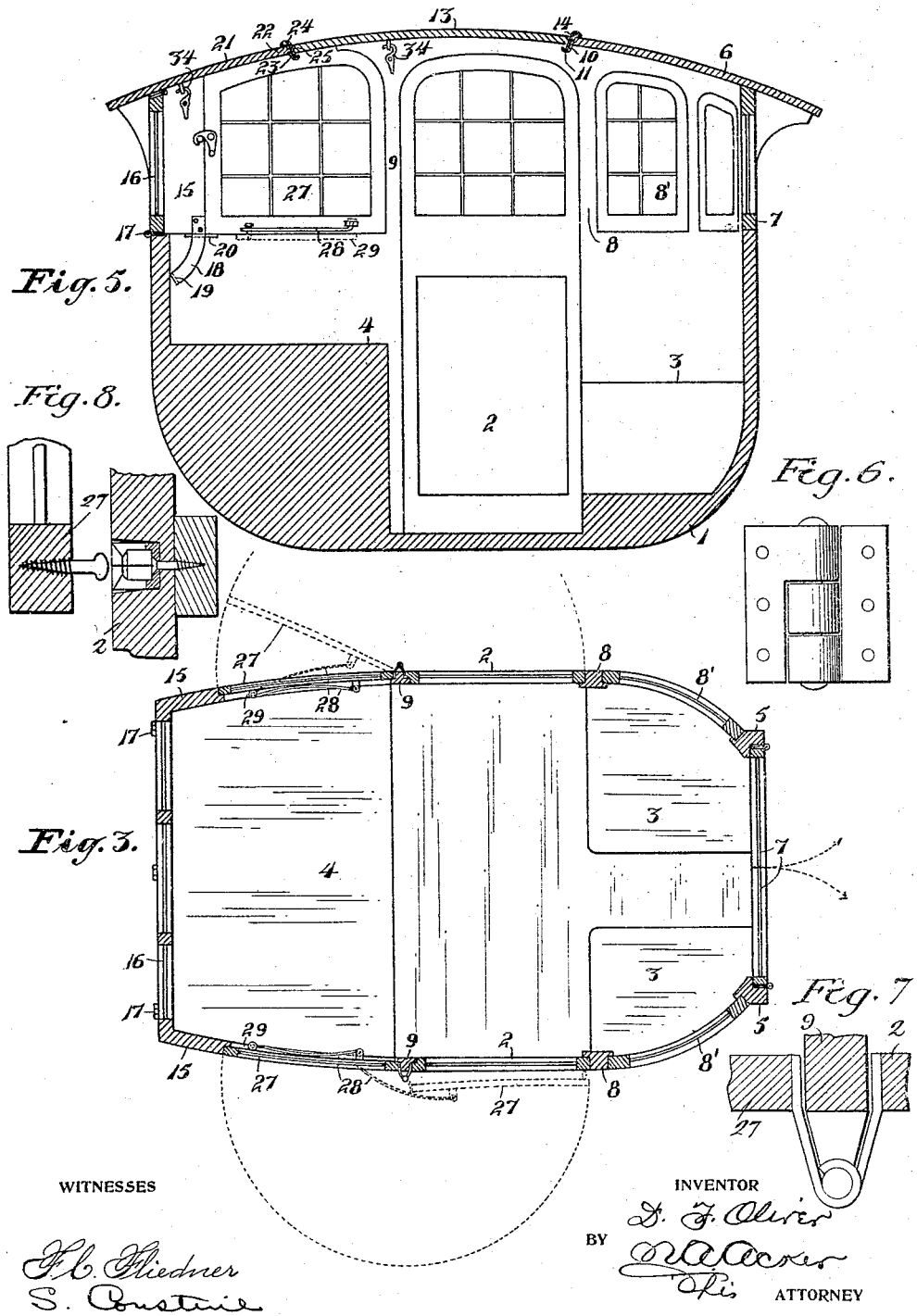

UNITED STATES PATENT OFFICE.

DOCTOR FRANKLIN OLIVER, OF SAN FRANCISCO, CALIFORNIA.

VEHICLE-BODY.

1,199,600.   Specification of Letters Patent.   Patented Sept. 26, 1916.

Application filed October 17, 1912, Serial No. 726,310. Renewed January 22, 1916. Serial No. 73,756.

*To all whom it may concern:*

Be it known that I, DOCTOR FRANKLIN OLIVER, a citizen of the United States, residing at the city and county of San Francisco and State of California, have invented certain new and useful Improvements in Vehicle-Bodies, of which the following is a specification.

The present invention relates to an improved vehicle body of the closed glass panel type, in which the sections which are to be opened are formed of glass panels in place of the fabric materials now in use, and has for its principal object to provide a vehicle body in which the top thereof is so constructed and mounted that the sections thereof may be folded in a convenient manner to provide an open vehicle body.

Another object is to provide a roof section which is capable when the top is in a folded position of being moved forwardly to permit the occupants to stand erect in the vehicle when entering or leaving the same.

The invention consists in a vehicle body of the closed type provided with a roof divided transversely into three sections, the forward section of which is rigidly supported above the vehicle body, glass panels extending from the vehicle body to the roof thereof, a rear panel hinged to the body and adapted to swing rearwardly, a rear roof section hinged to the upper edge of the rear panel, rear side panels hinged to the rigid side portions of the vehicle body, and an intermediate roof section connecting the forward and rear roof sections and adapted when the roof is folded to slide forwardly on the forward rigid roof section and be supported thereby.

With the above mentioned and other objects in view, the invention consists in the construction and novel combination of parts hereinafter fully described, illustrated in the accompanying drawings and pointed out in the claims hereto appended.

Reference now being had to the accompanying drawings in which is disclosed a completely constructed device for fully carrying out my invention, and in which—

Figure 1:
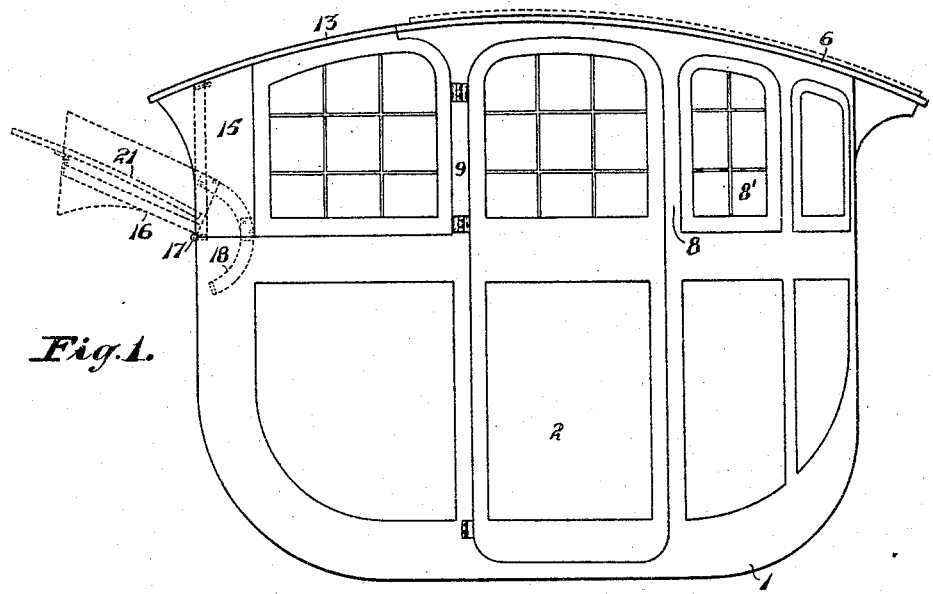
Figure 2:
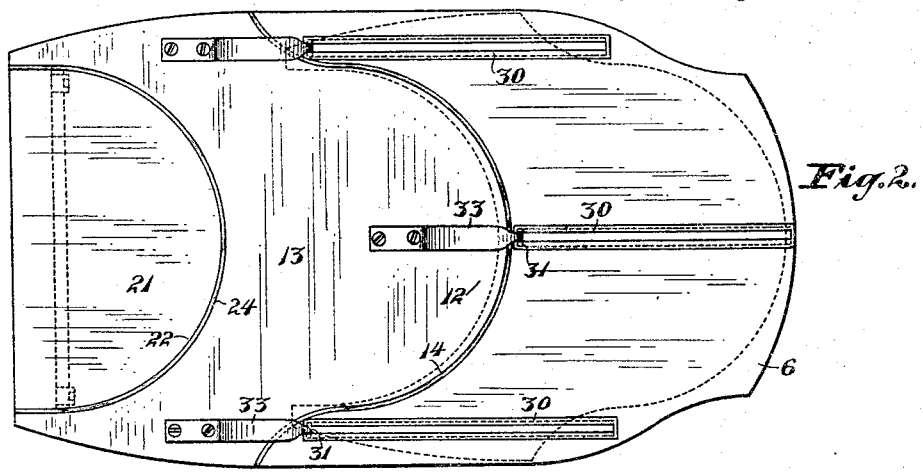
Figure 4:
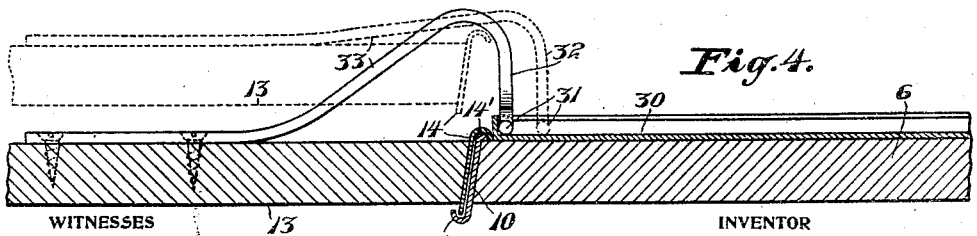

Figure 1 is a side elevation of my improved vehicle body disclosing in dotted lines the rear panel and rear roof section in their folded positions and the intermediate roof section pushed forward and resting on the stationary forward roof section. Fig. 2 is a top plan view disclosing the shape of the several roof sections and also disclosing the means for guiding the intermediate section onto the forward section. Fig. 3 is a top plan in section disclosing the manner of hinging the various panels. Fig. 4 is a view in detail of the joint between the intermediate and front roof section and between the intermediate and rear roof sections, and in dotted lines disclosing the manner of disconnecting said joint. Fig. 5 is a longitudinal sectional view taken through the center of the vehicle body. Fig. 6 is an enlarged face view of one of the hinges connecting a door and a side panel to one of the standards; Fig. 7 is a plan view of the same with the door, side panel and standard shown in section; and Fig. 8 is an enlarged sectional plan view of a portion of a door, a portion of a side panel and the attaching device being shown in separated position.

Referring more particularly to the drawings, the reference numeral 1 designates the lower solid panel portion of a vehicle body, provided with the usual hinged doors 2, and front and rear seats 3 and 4, and extending upwardly from the portion 1 are the front cover standards 5 which support the rigid section of the vehicle roof 6, and to the standards are hinged the forward glass panels 7 which swing as in the dotted lines—Fig. 3. Standards 8 also extend upwardly from the vehicle body and also provide a support for the stationary roof section 6, and positioned between the cover standards 5 and standards 8 are other glass panels 8'. The rear edge of the front stationary roof section is supported by standards 9 to one edge of which are hinged the upper portion of the doors 2, and the forward edge of said doors close against the standards 8.

The rear edge of the stationary roof section is cut inwardly, in the form of a semicircle, and to said edge is secured a metallic strip 10, curved upwardly and rearwardly at its lower edge as at 11, and in said semi-circular cut out portion of the stationary roof section is adapted to be inserted the forwardly semi-circular curved portion 12 of the intermediate roof section 13, to the forward edge of which is secured a metallic strip 14, curved forwardly at its upper edge as at 14' and adapted to overlap the upper edge of the strip 10 when the roof sections are in their assembled positions. The rear portion of the intermediate roof section rests on the rear corner standards 15 connected by a rear glass panel 16 and the standards and panel hereinafter termed a rear panel section are hinged as at 17' to the rear upper edge of the body, and are adapted to swing rearwardly as in dotted lines—Fig. 1, they being limited in their rearward movement by suitable curved arms 18, secured at their upper ends to the lower edges of the standards 15, and their lower ends telescoping in the body 1, the panel section when in its rearwardly inclined position drawing the arms 18 upwardly in the slots until the curved lower ends 19 thereof engage a plate 20 at the top of the slot.

Hinged to the upper edge of the rear glass panel 16 and adapted to swing downwardly thereon is a rear roof section 21, having a semi-circular forwardly extending edge 22, to which is attached a metallic strip 23, the upper edge of which is engaged by the forwardly and downwardly curved end 24, of a metallic strip 25, secured to the rear edge of a cut out portion in the rear of the intermediate roof section, and said rear roof section completely filling said cut out portion when the roof sections are in their assembled positions.

Glass side panels 27 are hinged at their forward edge to the standards 9, and close the space between standards 9 and the rear corner standards 15, and said panels are adapted to swing forwardly onto the vehicle doors when the roof sections are in their lowered position. To the panels 27 are hinged the retaining arms 28, which slide in and frictionally engage suitable slots 29 in the vehicle body.

By the arrangement described the glass side panels 27 can be readily swung into a partially open position to provide a desired ventilation with the body at the same time shielding the occupants of the body against draft, as will be readily understood by reference to the dotted line position of panels 27 on the left-hand side of the body.

By reference to Figs. 1 and 3, it will be noticed that the hinges connecting the forward edges of the glass side panels 27 with the standards 9 have their pintles common with the hinges connecting the doors 2 with the standards 9 so that the glass side panels 27 when in completely open position (shown in dotted lines on the right-hand side of the body in Fig. 3) lie close to the outer faces of the said doors 9 and thus can swing with the same.

The stationary roof section 6 is provided on its upper surface with longitudinally extending parallel spaced dovetailed guides 30, in which project the enlarged heads 31 formed at the lower ends of vertical extending portions 32 of spring arms 33, carried by the intermediate roof section 13.

The roof sections when in their assembled positions are locked by suitable catches 34.

To convert the body from a closed to an open type and the parts being in position as disclosed in full lines in the drawing, it is accomplished in the following manner:— The catches locking the roof sections in position are first unlocked, the forward edge of the intermediate roof section is raised against the action of the spring arms 33, as in dotted lines—Fig. 4, the metallic strip is disengaged from the strip 23 and the intermediate roof section is pushed forwardly on the stationary section 6, as in dotted lines— Fig. 2, the guides 30 retaining the same in position. The rear roof section 21 is now folded downwardly on the rear panel 16, between the standards 15, and when in said folded position the rear panel section is tilted rearwardly as in dotted lines—Fig. 1, the glass panels 27 are now swung outwardly as in Fig. 3 against the outer face of the vehicle doors 2, and are moved therewith in any suitable manner. It will be observed that a vehicle body of the landaulet type has been provided and that the roof, rear, and side panel sections thereof are capable of being folded to provide an open body and that by constructing the roof in the hereinbefore described manner, the intermediate section may be moved forwardly and provide sufficient head room for the occupants when entering or alighting from the vehicle.

Having thus described my invention what is claimed as new and is desired to be protected by Letters Patent is—

1. In a vehicle body, the combination with a stationary roof section provided with guide rails, an intermediate roof section, spring arms carried by said intermediate roof section and engaging said guide rails, standards supporting said intermediate roof section and said roof section capable of a sliding movement over said stationary roof section and supported thereby when in its folded position, a back member hinged to the rear of the vehicle body, a rear roof section hinged to said back member and capable of folding thereon, and rear side sections positioned between the standards supporting the intermediate roof sections and said back member.

2. In a vehicle body, the combination with a stationary roof section provided with guide rails, an intermediate roof section, spring arms carried at the forward edge of said intermediate roof section and engaging said guide rails, standards supporting said intermediate roof section and said roof section being capable of sliding movement over said stationary roof section and supported thereby when in its folded position, a back panel section hinged to the rear of the vehicle body and capable of being inclined rearwardly, a rear roof section hinged to said back panel section and capable of folding thereon, rear side panel sections hinged to the standards supporting the intermediate roof section and positioned between the standards supporting the intermediate roof section and said back member, and means for limiting the rearward inclination of said back panel section.

3. In a vehicle body, the combination with a stationary roof section cut inwardly at its rear edge, an intermediate roof section cut inwardly at its rear edge and provided with an outwardly curved forward edge adapted to fit the rear edge of said stationary roof section, standards supporting said intermediate roof section and said roof section capable of sliding movement over said stationary roof section and supported thereby when in its folded position, a back panel section hinged to the rear of the vehicle body and capable of being inclined rearwardly, a rear roof section hinged adjacent its rear edge to said back panel section and curved outwardly at its forward edge to contact with the rear edge of said intermediate roof section, and said rear roof section capable of folding on said rear panel section, and rear side panel sections hinged to the standards supporting the intermediate roof section and positioned between said standards and said back panel.

4. In a vehicle body, the combination with a stationary roof section curved inwardly at its rear edge and provided on its upper surface with guide rails, an intermediate roof section curved inwardly at its rear edge and provided with an outwardly curved forward edge adapted to contact with the rear edge of said stationary roof section, spring arms carried by said intermediate roof section and engaging said guide rails, standards supporting said intermediate roof section and said roof section capable of sliding movement over said stationary roof section and supported thereby when in its folded position, a back panel section hinged to the rear of the vehicle body and capable of being inclined rearwardly, a rear roof section hinged adjacent its rear edge to the upper edge of said rear panel section and curved outwardly at its forward edge to contact with the rear edge of said intermediate roof section, and said rear roof section capable of folding on said rear panel section, and rear side panel sections hinged to said standards supporting the intermediate roof section and positioned between said standards and said back panel section.

5. In a vehicle body, the combination of a roof having foldable sections, standards for the support of a folding section, doors hinged at their rear edges to the said standards to swing outwardly, and side panels hinged at their forward edges to the said standards to swing outward for ventilating purposes at the time the roof sections are in extended position and to allow of swinging the panels onto the outer faces of the said doors to move with the latter on opening and closing the doors and at the time the said roof sections are in folded position.

In testimony whereof I have signed my name to this specification in the presence of two subscribing witnesses.

DOCTOR FRANKLIN OLIVER.

Witnesses:
N. A. ACKER,
D. B. RICHARDS.

Copies of this patent may be obtained for five cents each, by addressing the "Commissioner of Patents, Washington, D. C."